No. 638,711. Patented Dec. 12, 1899.
C. P. HIGGINS.
MACHINE FOR MAKING OVAL HAND HOLES.
(Application filed Apr. 24, 1899.)
(No Model.) 3 Sheets—Sheet 3.

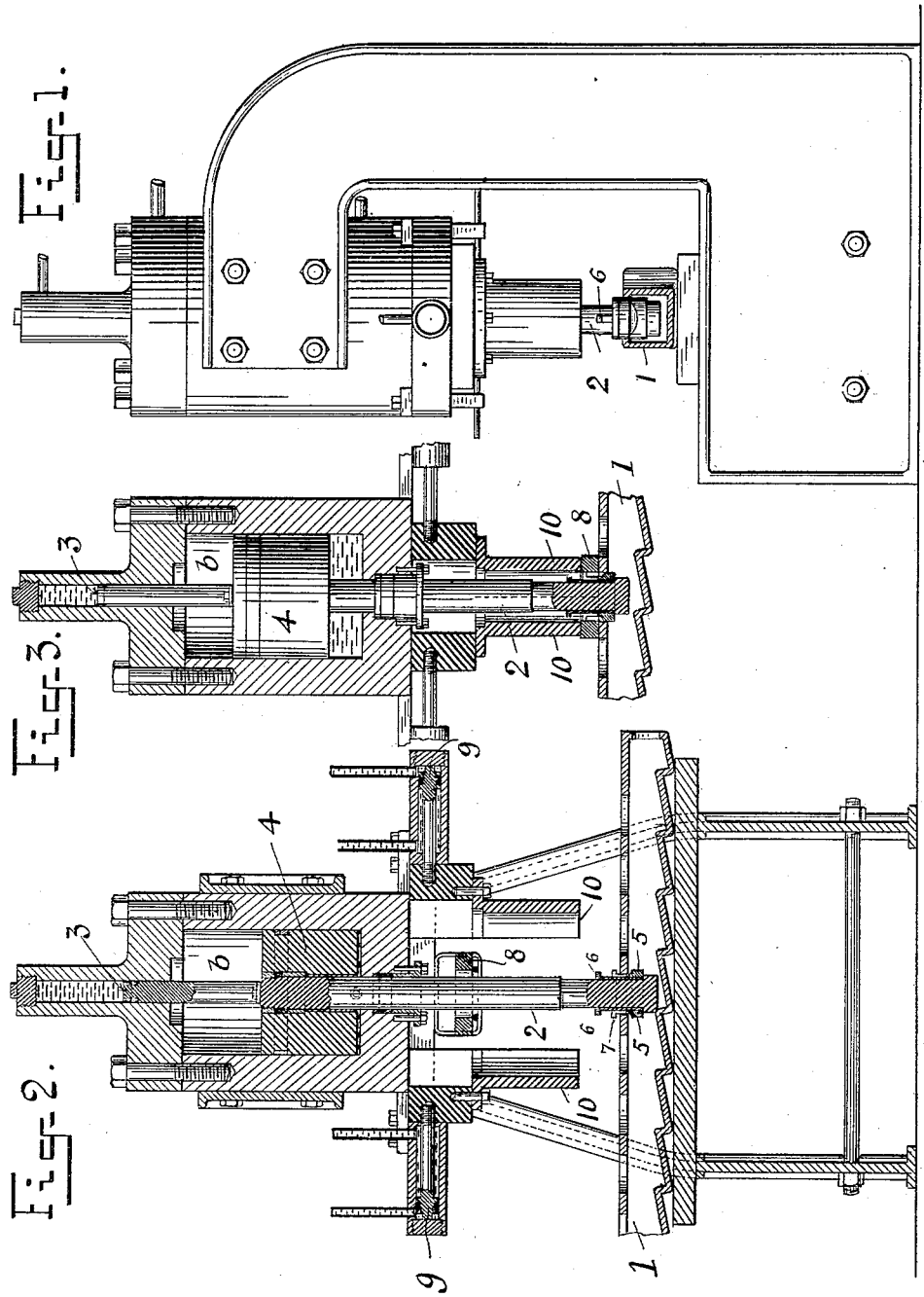

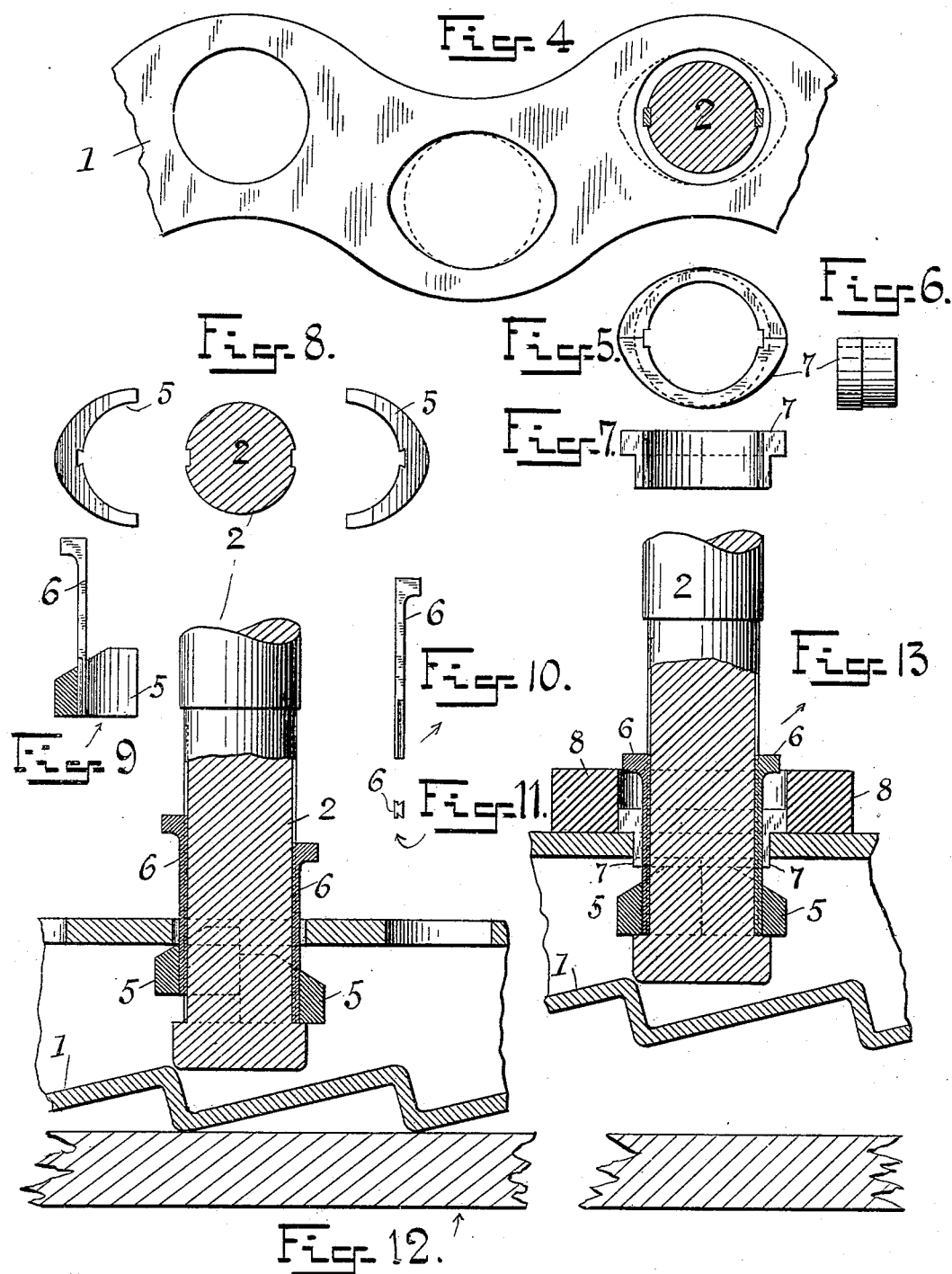

Witnesses
Charles Hanimann.
George A. Rowell.

Inventor
Campbell P. Higgins
By his Attorney

UNITED STATES PATENT OFFICE.

CAMPBELL P. HIGGINS, OF ROSELLE, NEW JERSEY, ASSIGNOR TO THE BABCOCK & WILCOX COMPANY, OF NEW YORK.

MACHINE FOR MAKING OVAL HAND-HOLES.

SPECIFICATION forming part of Letters Patent No. 638,711, dated December 12, 1899.

Application filed April 24, 1899. Serial No. 714,281. (No model.)

*To all whom it may concern:*

Be it known that I, CAMPBELL P. HIGGINS, a citizen of the United States, residing at Roselle, in the county of Union and State of New Jersey, have invented certain new and useful Improvements in Machines for Making Oval Hand-Holes, of which the following is a specification, reference being had therein to the accompanying drawings.

This invention is designed to change the hand-holes in headers of sectional steam-generators from a round to an oval or other desired shape.

The object of an elongated shape of the hand-hole is to gain greater access to the water-tubes connected with the header in line therewith, to effect the removal or renewal in the latter instance of a greater number of tubes adjacent to the hand-hole than can be accomplished with the former, and to more conveniently operate an expanding or cleaning tool, as referred to in a patent granted to me June 7, 1887, No. 364,348.

The invention consists in a machine in which the header is placed, having cutting or broaching tools adjusted to be operated through and upon the previously-formed round hand-hole, as hereinafter described, reference being had to the accompanying drawings, forming a part of this specification, in which—

Figure 14:
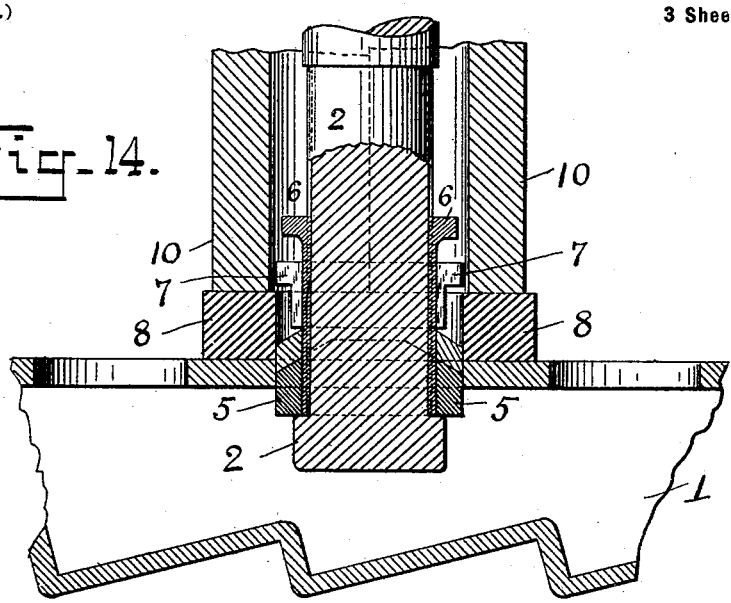
Figure 15:
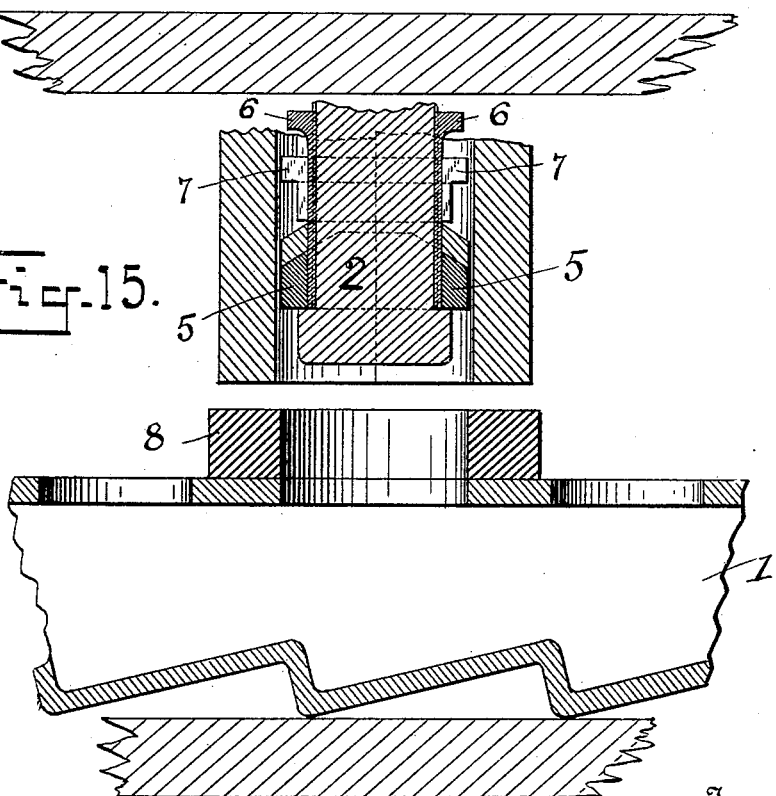

Figure 1 is a side elevation; Fig. 2, a vertical section; Fig. 3, a sectional view explanatory of the operation of the machine; Fig. 4, a face view of a part of a header, showing the round form of the hand-hole made by a boring-tool, the oval hole, and a section of the cutter-bar. Figs. 5, 6, and 7 are different views of the guide-pieces which locate one of the dies; Fig. 8, the two cutting-blades and the tool-holder detached; Fig. 9, a cutting-blade; Fig. 10, a key for securing the blade; Fig. 11, a cross-section of the key; Figs. 12, 13, 14, and 15, enlarged views of the header and assembled devices in various operative positions.

The details of the apparatus may best be referred to in the descriptions of the assembling and operation of the parts.

1 represents the header in the various views, which rests upon the table of the machine, with the hole to be operated upon placed directly beneath a tool-holder 2. This holder 2 is connected with the plunger 3 and piston 4 of a hydraulic ram, the holder being forced down by the plunger 3, so that its head is in place within the header, as shown in Figs. 1, 2, and 3, this movement of the plunger 3 also depressing the piston 4 to its lowest position, as shown in Fig. 2. The cutting or broaching blades 5 are then passed through adjacent holes into the header and placed in position on the holder 2 and the key 6 inserted in the keyway of the cutter and corresponding dovetailed way on the holder. (Shown in the transverse views, Fig. 8.) The guide-rings 7 (shown in Figs. 6, 7, and 13) are then placed around the holder 2, with the depending flange projecting through the hole in the header and embracing the key 6. The cutting-die 8 is then laid outside the oval head of the guide-ring 7, all as shown in Fig. 13. Water is then admitted to the small side rams 9, which close in the supporting-blocks 10, as shown in Fig. 3, and these form the support for cutting-die 8. The cutting devices are thus assembled complete and ready for the broaching operation, as also shown in Fig. 2. Pressure is then applied beneath the piston 4, and the cutter-holder 2 is drawn upwardly through the hole in the header, which brings the cutting-blades 5 in contact therewith and cuts out the small crescent-shaped pieces on either side. (Indicated in the central hole of Fig. 4.)

Having thus fully described my invention, what I claim, and desire to secure by Letters Patent, is—

1. A machine for broaching round hand-holes to an oval or other desired form in headers for sectional steam-generators, comprising a power cutter-holder reciprocating within the hand-hole, combined with a stationary cutting-die, said holder having removable cutting-blades which are adjusted in working position within the header and reciprocated to cut out the sides of the hand-hole to the desired shape, as set forth.

2. In a machine for broaching hand-holes in headers for sectional steam-generators, substantially as described, the combination with a reciprocating tool-holder and cutting-blades of guide-rings 7, stationary cutting-die 8 and adjustable supporting-blocks 10, substantially as set forth.

In testimony whereof I affix my signature in presence of two witnesses.

CAMPBELL P. HIGGINS.

Witnesses:
JOSEPH F. JAQUITH,
JOSEPH RUSHTON.